Inventor
William C. De Roo,
By Murray and Gugelter

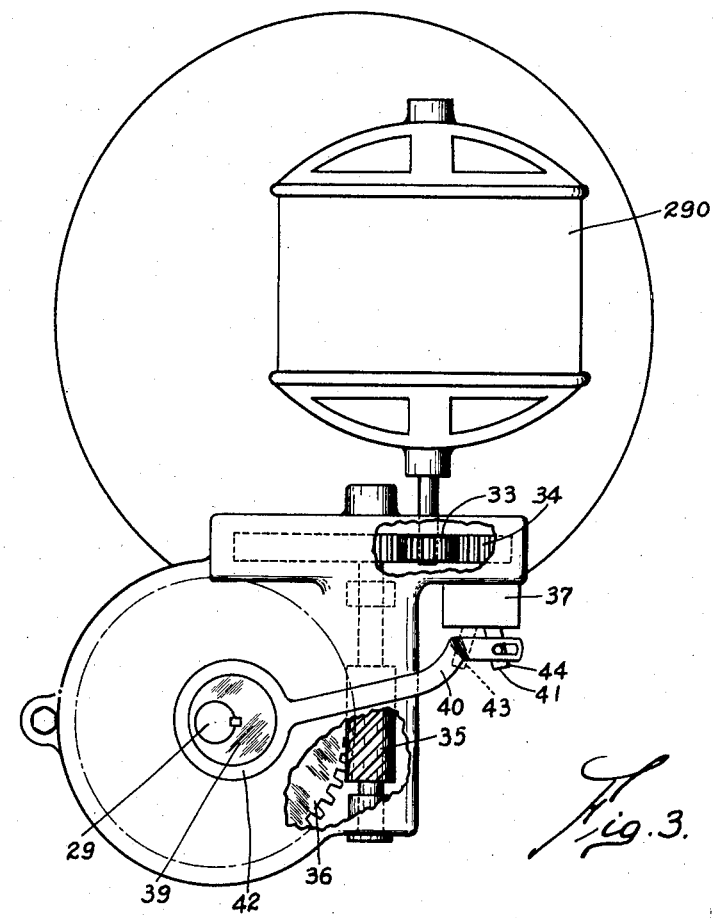
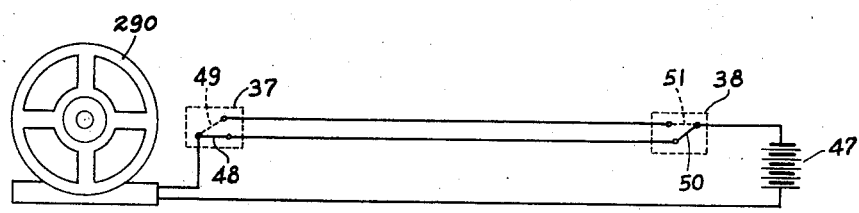

Patented Sept. 29, 1931

1,825,181

UNITED STATES PATENT OFFICE

WILLIAM C. DE ROO, OF CINCINNATI, OHIO, ASSIGNOR TO THE FOSDICK MACHINE TOOL COMPANY, OF CINCINNATI, OHIO, A CORPORATION OF OHIO

ELECTRICALLY OPERATED COLUMN CLAMP FOR RADIAL DRILLS

Application filed November 27, 1926. Serial No. 151,209.

This invention relates to electrically controlled column clamping means for radial drills, and has for an object to provide improved means for clamping the drill arm of a drilling machine in radial positions.

Another object is to provide a simple push button means whereby the column clamp may be actuated from the drill head.

Another object is to provide means for the purposes stated, which are durable and simple of construction.

These and other objects are attained by the means described herein and disclosed in the accompanying drawings in which:

Fig. 3 is a view taken on line 3—3 of Fig. 1.

Fig. 4 is a diagrammatical view showing the electrical circuit of the device.

Figure 1:
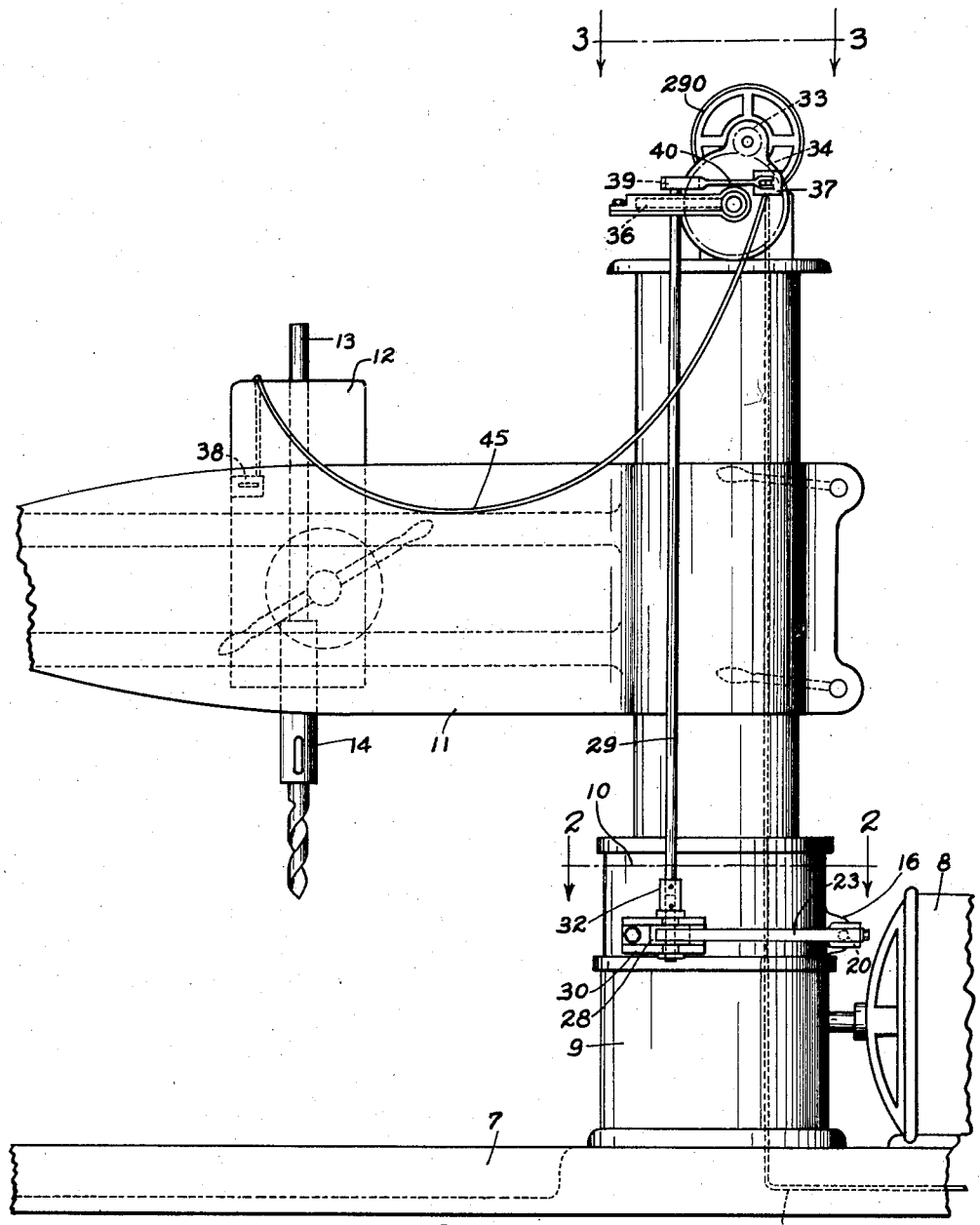
Fig. 1 is a rear elevational view of a radial drill embodying the invention.

The device employing the present invention is herein exemplified on a radial drill machine of usual design. The base 7 carries the drive motor 8 and column base 9 upon which a tubular column 10 is rotatably mounted for positioning the drill arm 11 in radial positions. The drill arm 11 supports a drill head 12 provided with the usual drill spindle 13 and chuck 14. Drill arm 11 is movable longitudinally of the rotatable column by any suitable means commonly employed for such purpose. Perforate lugs 15 and 16 on the rotatable column 10 form part of a split bearing adapted to receive a clamping member which may take the form of a screw 17, one end 18 of which is threaded to receive a handle 19. Suitable stop lugs 60 and 61 on the handle 19 and lug 15 may be provided for abutment on one another. The screw 17 has formed at its other end a head 20 having a transverse bore 21 for receiving a pin 22. Pin 22 pivotally secures head 20 to a lever 23 provided with an enlarged bore 24 for receiving the head 20 of the screw 17. Perforate block 25 is adjustably secured to an extension 26 on the lever 23 by means of a bolt 27. The block abutting lug 16 tapers towards its free end and serves as a fulcrum and adjusting means for lever 23. It should be noted that movement of the lever 23 about the fulcrum 25 serves to bring together the lugs 15 and 16 of the split bearing, thus binding the rotatable column 10 to the rigid inner column 9. The clamping action thus attained is released by movement of the lever 23 in the opposite direction.

Figure 2:
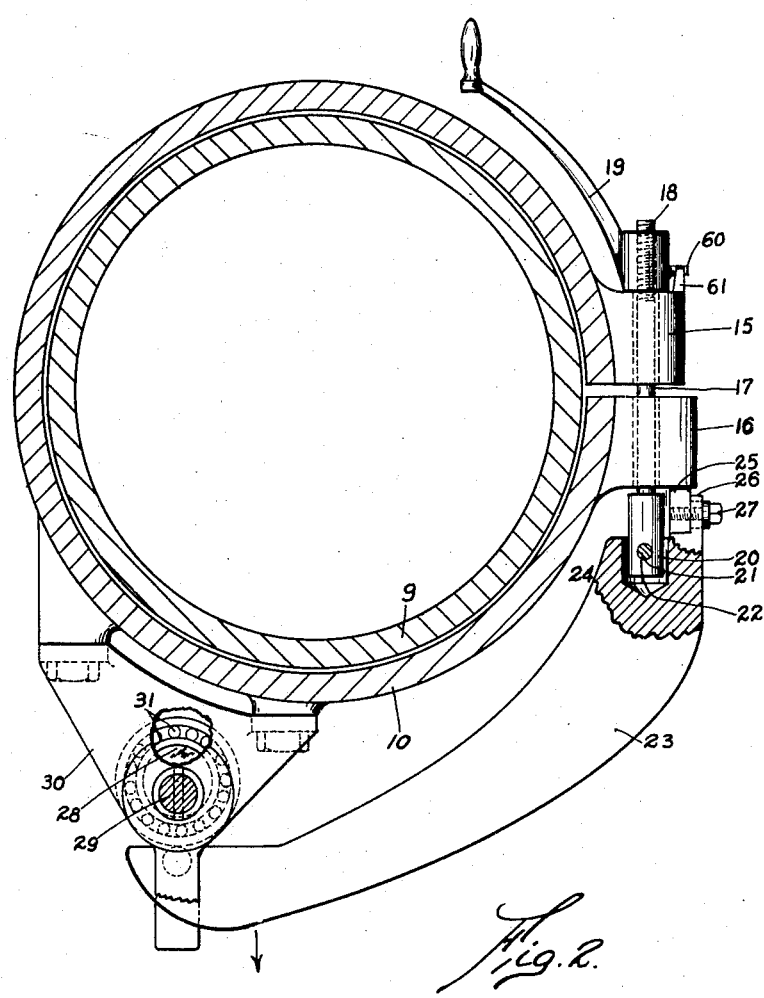
Fig. 2 is a sectional view taken on line 2—2 of Fig. 1.

Movement of the lever 23 is accomplished by means of a cam 28 fixedly secured to a vertical cam shaft 29 journaled in a suitable bearing bracket 30 on the rotatable column. If desired the cam 28 may be provided with ball bearings 31 for insuring frictionless contact of the cam upon the lever 23. As shown in Figs. 1 and 2, shaft 29 may be composed of two parts connected by a sleeve 32. This construction is used to facilitate assembly of the cam mechanism.

Rotation is imparted to cam shaft 29 by means of a small electrical motor 290 mounted on the rotatable column, and a suitable train of gears comprising a pinion 33 on the motor shaft, gear 34 meshing therewith, worm 35, and worm wheel 36, the latter being keyed or otherwise secured to shaft 29. It is obvious that a one-half revolution of shaft 29 causes cam 28 to move lever 23 in the direction of the arrow thus contracting the split bearing comprising the lugs 15 and 16, for clamping the column 10 to column 9. A subsequent half revolution of shaft 29 serves to release the split bearing, whereupon the rotatable column may be moved relative to the rigid inner column 9.

Clamping action is controlled by means of two three-point electrical switches, 37 and 38. Switch 37 is automatically actuated by a pitman 40, one end of which is connected to actuating lever 41 of switch 37, the other end of which has ring 42 formed thereon for receiving the cam 39. It should be noted that each successive half revolution of shaft 29 and cam 39 actuates the pitman 40 and causes switch lever 41 to assume successive positions indicated by 43 and 44. Switch 37 may be designated as a stop switch since its function is to break the electrical circuit to the motor 290 upon each successive movement of the lever 41. Switch 38 is a manually operated start switch for starting motor 290, which actuates the clamping mechanism.

Switch 38 is preferably positioned on the drill head 12 so as to enable an operator of the machine to conveniently clamp and release the column without changing his position at the drill head. Flexible cable 45 provides electrical connection between the start switch 38 and stop switch 37. Lead in wires 46 may be concealed within the column, if desired.

The operation of the device is as follows. An operator assuming his position before the drill head 12 may position the drill arm above his work, whereupon he actuates the switch 38 to start motor 290. Motor 290, through the train of gears, rotates shaft 29 and the cams 28 and 39 secured thereto, causing cam 28 to actuate lever 23. Lever 23 thereupon moves about its pivot at 25, thus causing the split bearing to clamp the column 10 upon column 9. This operation is performed by a one-half rotation of shaft 29. At the end of the half rotation, cam 39 is rotated so as to actuate switch lever 41, thereby breaking the circuit to the motor 290. The drill arm 11 is now held in clamped position for performing the drilling operation. Upon completion of the drilling operation the operator again actuates the switch 38 whereupon the clamping action is released, and switch lever 41 is brought back to its position indicated at 44 to break the motor circuit for stopping the motor. It will thus be observed that an operator need never leave his position at the drill head.

In Fig. 4 is shown the electrical connections between the switches 37 and 38, motor 290, and source of power 47. As shown therein the circuit to motor 290 is closed, indicating that the motor 290 is operative. Upon completion of the resultant clamping or releasing operation, the contact bar 48 of switch 37 will assume the position shown at 49, whereupon the circuit is broken. The subsequent operation is effected by moving contact member 50 of switch 38 to the position shown at 51 whereupon the circuit to the motor 290 is again closed.

What is claimed is:

1. In a device of the class described, the combination of a rigid column, a rotatable column supported by the rigid column, a split bearing comprising perforate lugs on the rotatable column, a clamp screw adapted to be received in the perforations in the lugs, a lever, means for pivotally connecting the lever and one end of the clamp screw, a fulcrum block on the lever adapted to abut a lug of the split bearing, a bearing bracket on the rotatable column, a vertical rotatory cam shaft, the lower end of which is journaled in the bearing bracket, a cam on the cam shaft adapted to abut the lever for moving said lever about the fulcrum block, a second cam on the cam shaft, an electrical circuit comprising a motor, a manually operated start switch, and a stop switch, gearing for transmitting motion of the motor to the cam shaft, and a pitman associated with the second cam and the stop switch, for actuating the stop switch whereby the electrical circuit is broken for stopping the motor.

2. In a device of the class described, the combination of a rigid column, a rotatable column supported by the rigid column, a split bearing comprising perforate lugs on the rotatable column, a clamp member adapted to be received in the perforations in the lugs, an abutting means on one end of the clamp member, a lever, means for pivotally connecting the lever and the other end of the clamp member, a fulcrum block on the lever adapted to abut a lug of the split bearing, a cam shaft, a cam on the cam shaft adapted to abut the lever for imparting motion to the lever when the cam is moved, a second cam on the cam shaft, an electrical circuit comprising a motor, a start switch and a stop switch, means for transmitting motion of the motor to the cam shaft, and means associated with the second cam and the stop switch for actuating the stop switch whereby the electrical circuit is broken for stopping the motor.

In testimony whereof, I have hereunto subscribed my name this 15th day of November, 1926.

WILLIAM C. DE ROO.